Patented Sept. 5, 1944

2,357,741

UNITED STATES PATENT OFFICE 2,357,741

PRODUCTION OF GASOLINES

Donald Albert Howes and Eric William Musther Fawcett, Sunbury-on-Thames, England, assignors to Anglo-Iranian Oil Company Limited, London, England, a British joint-stock corporation No Drawing. Application October 17, 1941, Serial No. 415,422. In Great Britain October 28, 1940.

3 Claims. (Cl. 196—78)

This invention relates to the production of gasolines or components thereof of high octane rating from products of oil cracking processes or other processes involving the thermal treatment of carbonaceous materials.

It is known that these products usually contain high proportions of unsaturated hydrocarbons, which render them unsuitable for incorporation in significant proportions in gasolines for use as aviation gasolines. It is true that these unsaturated hydrocarbons may be converted to corresponding saturated hydrocarbons by hydrogenation, usually by a catalytic hydrogenation process; but we find that while the octane number of the gasoline fraction of these unsaturated products is relatively high (octane number 70–80), the octane rating of the saturated products prepared by a simple hydrogenation process is often very much lower (60–65), and these latter products being of low grade are of little use in the production of aviation gasolines of high octane number. We believe that this fall in octane number on hydrogenation is due to the fact that the original products contain unsaturated hydrocarbons on a relatively straight chain structure and the straight chain saturated hydrocarbons formed by their hydrogenation have a very low octane rating. The present invention has among its objects to avoid this disadvantage.

According to the invention, in the production of a fuel adapted for use as an aviation gasoline or constituent of such gasoline, the starting material or a fraction of the starting material (usually boiling below 200° C.) and containing substantial proportions of unsaturated hydrocarbons is first submitted to catalytic isomerization to modify the structure of the unsaturated hydrocarbons and the isomerized product is then treated in a catalytic hydrogenation process to yield a saturated or nearly saturated product well adapted for the purpose by reason of the fact that the final isomerized and hydrogenated product has a substantially higher octane number than a product obtained by direct hydrogenation of the starting material, i. e. without the isomerization stage.

The first stage of the process may be carried out at moderate temperatures within the range 0–600° C., and usually within the range 100° C.–400° C. Superatmospheric pressure may be employed, which in general favors polymerization of the unsaturated hydrocarbons and it is preferred to operate at pressures below 20 atmospheres. The isomerization catalysts used are of the type which are active in reactions involving the conversion of straight chain hydrocarbons to branched chain hydrocarbons and the following are typical: aluminium chloride, phosphoric acid on supports such as kieselguhr or silica gel, silica gel or silicates or natural clays impregnated with aluminium compounds such as aluminium oxide, natural alumino-silicates and clay, bauxite and the like, or a catalyst consisting of alumina and silica may be used at a reaction temperature in the range 300° C.–500° C., or a catalyst consisting of an acid phosphate of a metal or metals of group II of the periodic table at a reaction temperature in the range 100° C.–450° C. The applicants have found that for the treatment in the first stage phosphate catalysts are advantageous that are known for use in the polymerization of gaseous olefines. These comprise catalysts prepared from dihydrogen orthophosphate of cadmium and orthophosphoric acid, in which acid is present in excess, similar catalysts prepared from dihydrogen orthophosphate of cadmium, orthophosphate of copper, and phosphoric acid, the acid also being present in excess, and a calcium phosphate catalyst prepared from a calcium phosphate copper oxide and phosphoric acid in such proportion as to produce a neutral product, the respective catalysts being produced advantageously in a pelleted form, according to the United States Patent No. 2,128,126 and the British Patent No. 535,062.

Since many of these catalysts are also active in the polymerization of the unsaturated hydrocarbons, it is found advisable in actual practice to pass a proportion of steam or other inert diluent such as a saturated hydrocarbon, for example normal butane with the hydrocarbon feedstock, a procedure which we find represses the polymerization reaction.

The first or isomerization stage of the process may be carried out as a batchwise or continuous operation, but in general a continuous operation is preferred in which the hydrocarbon feedstock passes continuously under the determined temperature and pressure conditions through one or more reaction vessels packed with an isomerization catalyst, a part of the product stream being re-circulated to the same reaction vessel for further treatment if desired.

The product of the first or isomerization stage of the process then passes to the second or hydrogenation stage, which is normally carried out in the temperature range 100° C.–450° C., and usually under superatmospheric pressures in the range 20–250 atmospheres and in the presence of hydrogen. The catalysts used are those known to have hydrogenating activity, and comprise metals or metallic oxides such as nickel or mixtures of nickel and iron oxides or metallic sulphides or mixtures thereof such as a mixture of nickel and tungsten sulphides. Or again a catalyst may be used consisting of a tungsten disulphide or tungsten disulphide mixed with a sulphide of a metal of group VIII of the periodic table.

The process of the second stage is normally carried out in a continuous flow system.

The following is an example of practical conditions.

A sample of gasoline prepared by the cracking of an Iranian mineral oil, and having a boiling range below 200° C., a bromine number of 51 and an octane rating (C. F. R. motor method) of 72, was passed through a reaction vessel containing a catalyst consisting of phosphoric acid on kieselguhr in pellet form. The reaction temperature was 300° C., and the pressure atmospheric. A flow rate of five volumes of gasoline per hour per volume of catalyst was employed. After removal of a minor proportion of polymer boiling above 200° C., namely 1% by volume— the octane rating of the product was found to be 75. This product was then mixed with hydrogen and passed to a second reaction vessel containing a catalyst consisting of a mixture of nickel and tungsten sulphides. The temperature was 300° C., the pressure was 100 atmospheres and the throughput was such as to yield a product with a bromine number below 3. The octane rating of the final product was 72.

When the original gasoline was directly hydrogenated under the conditions of the second stage the octane rating of the product was found to be 61.

We claim:

1. A process for the treatment of a low-boiling normally liquid fraction of a cracked mineral oil which fraction is of a boiling range within that of gasoline and is unsuitable for use as aviation gasoline material because of the presence of a substantial proportion of straight chain unsaturated hydrocarbons, to render the fraction more suitable for such use comprising the steps of: contacting the fraction at a temperature in the range 100° C.–450° C. and a pressure not substantially exceeding 20 atmospheres with an acid phosphate of a metal of Group II of the periodic table for a time sufficient to convert straight chain unsaturated hydrocarbons contained in the fraction into branched chain unsaturated hydrocarbons; and, then contacting the reaction product at a temperature in the range 100–450° C. and a pressure not substantially exceeding 250 atmospheres and in the presence of hydrogen with a hydrogenation catalyst for a time sufficient to convert unsaturated hydrocarbons contained therein into saturated hydrocarbons.

2. The process of claim 1 in which the hydrogenation catalyst is a material selected from the group consisting of tungsten disulphide and tungsten disulphide mixed with a sulphide of a metal of Group VIII of the periodic table.

3. A process for the treatment of a low-boiling normally liquid fraction of a cracked mineral oil which is unsuitable for use as aviation gasoline material because of the presence of a substantial proportion of unsaturated hydrocarbons, to render the fraction more suitable for such use comprising the steps of: contacting the fraction at a temperature in the range 100° C.–450° C. and a pressure not substantially exceeding 20 atmospheres with an acid phosphate of a metal of Group II of the periodic table for a time sufficient to isomerize unsaturated hydrocarbons contained in the fraction; and, then contacting the reaction product at a temperature in the range 100–450° C. and at a superatmospheric pressure and in the presence of hydrogen with a hydrogenation catalyst for a time sufficient to convert unsaturated hydrocarbons contained therein into saturated hydrocarbons.

DONALD ALBERT HOWES.
ERIC WILLIAM MUSTHER FAWCETT.